(12) United States Patent
Masuko

(10) Patent No.: US 9,905,030 B2
(45) Date of Patent: Feb. 27, 2018

(54) IMAGE PROCESSING DEVICE, IMAGE PROCESSING METHOD, INFORMATION STORAGE MEDIUM, AND PROGRAM

(71) Applicant: Rakuten, Inc., Tokyo (JP)

(72) Inventor: Soh Masuko, Tokyo (JP)

(73) Assignee: RAKUTEN, INC, Tokyo (JP)

(*) Notice: Subject to any disclaimer, the term of this patent is extended or adjusted under 35 U.S.C. 154(b) by 88 days.

(21) Appl. No.: 14/766,984

(22) PCT Filed: Mar. 29, 2013

(86) PCT No.: PCT/JP2013/059767
§ 371 (c)(1),
(2) Date: Aug. 11, 2015

(87) PCT Pub. No.: WO2014/155744
PCT Pub. Date: Oct. 2, 2014

(65) Prior Publication Data
US 2015/0379750 A1    Dec. 31, 2015

(51) Int. Cl.
*G09G 5/00*  (2006.01)
*G06T 11/60*  (2006.01)
(Continued)

(52) U.S. Cl.
CPC .... *G06T 11/60* (2013.01); *G06T 2207/20221* (2013.01); *G09G 5/14* (2013.01);
(Continued)

(58) Field of Classification Search
CPC . G06T 11/60; G06T 2207/20221; G09G 5/14; G09G 2340/125; G09G 5/395; G09G 2340/10; G09G 2340/12
See application file for complete search history.

(56) References Cited

U.S. PATENT DOCUMENTS 5,857,707 A * 1/1999 Devlin ............... B42D 15/00
                                                  283/56
8,260,064 B2 * 9/2012 Konno ............... G06F 17/289
                                                  382/229
(Continued)

FOREIGN PATENT DOCUMENTS

JP   2006-251902 A   9/2006
JP   2009-053838 A   3/2009
JP   2011-175569 A   9/2011

OTHER PUBLICATIONS

English Translation of International Search Report for PCT/JP2013/059767 dated Apr. 23, 2013.

*Primary Examiner* — Abderrahim Merouan
(74) *Attorney, Agent, or Firm* — Hubbs, Enatsky & Inoue PLLC

(57) ABSTRACT

An image processing device according to the present invention includes a display manner determination unit for determining a display manner of a second text in a cover image to be superimposed onto an original image integrated with a first text, so as to satisfy a predetermined condition concerning a coverage extent by which the first text in the original image is covered by the second text in the cover image, and for outputting position specifying data specifying a superimpose position at which the cover image integrated with the second text to be displayed in the display manner determined is superimposed onto the original image, so as to be correlated to the cover image.

9 Claims, 7 Drawing Sheets

(51) Int. Cl.
   *G09G 5/395* (2006.01)
   *G09G 5/14* (2006.01)
(52) U.S. Cl.
   CPC ......... *G09G 5/395* (2013.01); *G09G 2340/10* (2013.01); *G09G 2340/12* (2013.01); *G09G 2340/125* (2013.01)

(56) References Cited

U.S. PATENT DOCUMENTS

| | | | |
|---|---|---|---|
| 9,098,888 B1* | 8/2015 | Lin | G06K 9/18 |
| 2003/0200505 A1* | 10/2003 | Evans | G06K 9/033 |
| | | | 715/256 |
| 2005/0086702 A1* | 4/2005 | Cormack | G06F 17/289 |
| | | | 725/135 |
| 2006/0204111 A1 | 9/2006 | Koshi et al. | |
| 2006/0217954 A1* | 9/2006 | Koyama | G06F 17/289 |
| | | | 704/2 |
| 2007/0127043 A1* | 6/2007 | Maekawa | H04N 1/642 |
| | | | 358/1.9 |
| 2009/0003434 A1* | 1/2009 | Song | H04N 19/25 |
| | | | 375/240.01 |
| 2009/0055159 A1 | 2/2009 | Kato | |
| 2010/0231938 A1* | 9/2010 | Ohguro | G06F 17/211 |
| | | | 358/1.9 |
| 2011/0097693 A1* | 4/2011 | Crawford | G09B 5/065 |
| | | | 434/157 |
| 2011/0209044 A1 | 8/2011 | Kutsumi et al. | |
| 2012/0163668 A1* | 6/2012 | Englund | G06F 17/289 |
| | | | 382/103 |
| 2014/0029778 A1* | 1/2014 | Bartunek | H04R 25/30 |
| | | | 381/317 |
| 2014/0172408 A1* | 6/2014 | Vukosavljevic | G06F 17/211 |
| | | | 704/2 |

\* cited by examiner

IMAGE PROCESSING DEVICE, IMAGE PROCESSING METHOD, INFORMATION STORAGE MEDIUM, AND PROGRAM

CROSS REFERENCE TO RELATED APPLICATIONS

This application is a National Stage of International Application No. PCT/JP2013/059767 filed on Mar. 29, 2013. The contents of the above document is incorporated herein by reference in its entirety.

TECHNICAL FIELD

The present invention relates to an image processing device, an image processing method, an information storage medium, a program, and in particular to processing for an image integrated with a text.

BACKGROUND ART

In the field of image processing, there may be a case in which a text in an original image integrated with the text is wished to be changed.

In a virtual shopping mall site, for example, an image including a text, such as final day or the like, for use in a bargain sale or the like and a background image including a figure or the like for calling for attention may be used. It will be convenient that a text can be read from such an image and, after translation into a different language, and that a text after translation can be displayed instead of the text before translation.

Patent Literature 1 discloses a technique for recognizing a character in a bitmap image obtained by scanning a document where characters are printed in black on a sheet in a single color, then refilling the pixels that render the character by pixels having the same attribute as that of the sheet, then translating the recognized character to obtain a new different character, and writing the obtained character on the pixels refilled.

CITATION LIST

Patent Literature

Patent Literature 1: Japanese Patent Laid-open Publication No. 2006-251902

SUMMARY

Technical Problem

According to the technique disclosed in Patent Literature 1, however, as the pixels that render a character before translation are refilled by pixels having the same attribute as that of the sheet, there is a problem that a large burden is resulted for the refilling processing, though the visibility of the characters after translation is high. Further, the burden for refilling can be made much larger when refilling the background including two or more colors.

An object of the present invention is to ensure visibility of a text after change when changing a text in an original image integrated with the text, while reducing a processing burden.

Solution to Problem

In order to achieve the above described object, an image processing device according to the present invention includes a determination unit for determining a display manner of a second text in a cover image to be superimposed onto an original image integrated with a first text, so as to satisfy a predetermined condition concerning a coverage extent by which the first text in the original image is covered by the second text in the cover image; and an output unit for outputting position specifying data specifying a superimpose position at which the cover image integrated with the second text to be displayed in the display manner determined by the determination unit is superimposed onto the original image, so as to be correlated to the cover image.

An image processing method according to the present invention includes determining a display manner of a second text in a cover image to be superimposed onto an original image integrated with a first text, so as to satisfy a predetermined condition concerning a coverage extent by which the first text in the original image is covered by the second text in the cover image; and outputting position specifying data specifying a superimpose position at which the cover image integrated with the second text to be displayed in the display manner determined by the determination unit is superimposed onto the original image, so as to be correlated to the cover image.

A program according to the present invention causes a computer to function as a determination unit for determining a display manner of a second text in a cover image to be superimposed onto an original image integrated with a first text, so as to satisfy a predetermined condition concerning a coverage extent by which the first text in the original image is covered by the second text in the cover image; and an output unit for outputting position specifying data specifying a superimpose position at which the cover image integrated with the second text to be displayed in the display manner determined by the determination unit is superimposed onto the original image, so as to be correlated to the cover image.

An information storage medium according to the present invention is a computer readable information storage medium storing a program for causing a computer to function as a determination unit for determining a display manner of a second text in a cover image to be superimposed onto an original image integrated with a first text, so as to satisfy a predetermined condition concerning a coverage extent by which the first text in the original image is covered by the second text in the cover image; and an output unit for outputting position specifying data specifying a superimpose position at which the cover image integrated with the second text to be displayed in the display manner determined by the determination unit is superimposed onto the original image, so as to be correlated to the cover image.

Further, in one embodiment of the present invention, the display manner may include a display typeface which is a factor for changing the coverage extent, and the determination unit may select any candidate typeface from among candidate typefaces that are candidates for the display typeface, and determine the display manner such that the second text displayed in the candidate typeface selected satisfies the predetermined condition.

Further, in one embodiment of the present invention, the determination unit may select a candidate typeface from among the candidate typefaces, beginning with a candidate typeface that results in a smaller amount of a non-transparent part of the second text.

Further, in one embodiment of the present invention, the candidate typefaces may include, besides a standard display typeface that makes a standard, at least any of an enlarged display typeface of which character size is larger than that of the standard display typeface, a bold display typeface of which line width of a character is thicker than that of the standard display typeface, and a calligraphic display typeface in which decoration is applied to an outside of an outer edge of a character.

Further, in one embodiment of the present invention, the image processing device may further include a calculation unit for calculating a coverage rate indicating a percentage at which a component part that constitutes the first text in the original image is covered by a non-transparent part of the second text, and the determination unit determines that the predetermined condition is satisfied when the coverage rate calculated by the calculation unit is equal to or greater than a predetermined threshold.

Further, in one embodiment of the present invention, the calculation unit may sequentially calculate the coverage rate for every candidate position indicating a candidate for a relative position of the second text relative to the first text, and the determination unit may determine, when the coverage rate sequentially calculated for every candidate position by the calculation unit is equal to or greater than the predetermined threshold, that the predetermined condition is satisfied as to the candidate position.

Further, in one embodiment of the present invention, the output unit may output the cover image and the position specifying data to an addition unit for adding an image in order to add the cover image at the position specified by the position specifying data on the original image.

Further, in one embodiment of the present invention, the output unit may output the cover image and the position specifying data to a display device equipped with an image display function in order to superimpose the cover image onto the position specified by the position specifying data on the original image.

Advantageous Effects of Invention

According to the present invention, a display manner of a second text in a cover image is determined such that a first text in an original image is sufficiently covered by the second text in the cover image. Therefore, by superimposing the cover image integrated with the second text onto the original image integrated with the first text, it is possible to ensure sufficient visibility of the second text in the cover image, while reducing a processing burden in refilling the pixels constituting the first text in the original image.

DESCRIPTION OF EMBODIMENTS

In the following, an example of an embodiment of the present invention will be described in detail based on the drawings.

Figure 1:
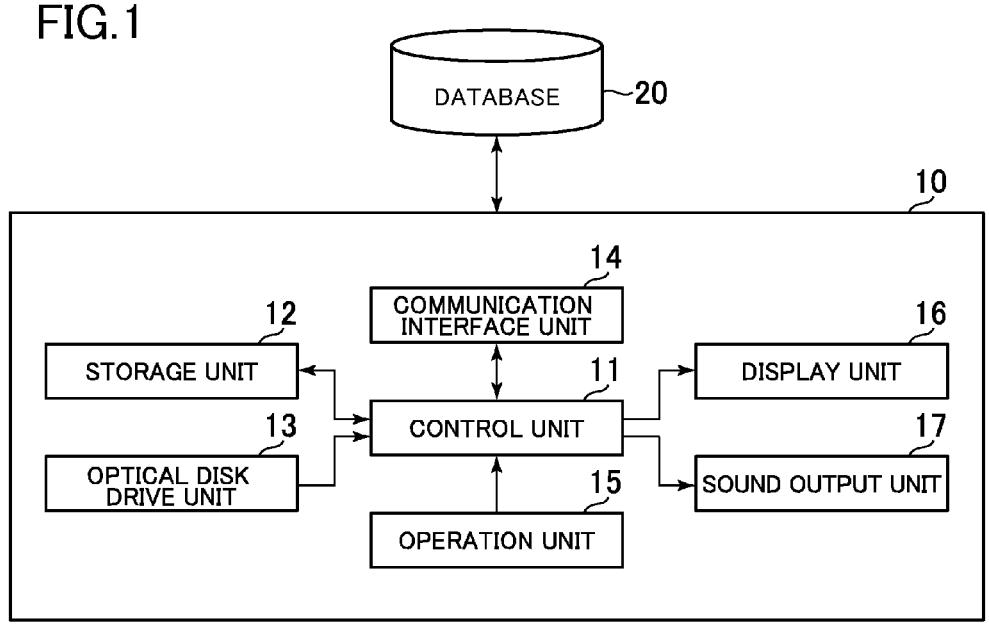
FIG. 1 shows one example of a hardware structure of an image processing device according to an embodiment of the present invention.

FIG. 1 shows an example of a hardware structure of an image processing device 10 according to an embodiment of the present invention. The image processing device 10 is implemented using, for example, a server computer, a desk top computer, a lap top computer, a tablet computer, or the like.

As shown in FIG. 1, the image processing device 10 includes a control unit 11, a storage unit 12, an optical disk drive unit 13, a communication interface unit 14, an operation unit 15, a display unit 16, and a sound output unit 17.

The control unit 11 includes, for example, one or more microprocessors, and executes information processing according to an operating system or a program stored in the storage unit 12. The storage unit 12 includes, for example, a RAM, a hard disk, or a solid state drive. The optical disk drive unit 13 reads a program and data stored in an optical disk (an information storage medium).

A program and data are supplied to the storage unit 12 via an optical disk. That is, a program and data are read from an optical disk by the optical disk drive unit 13, and stored in the storage unit 12. Note that a structural component for reading a program or data stored in an information storage medium (for example, a memory card) other than an optical disk may be included in the image processing device 10, so that a program and data may be supplied to the storage unit 12 via an information storage medium other than an optical disk.

The communication interface unit 14 is an interface for connecting the image processing device 10 to a communication network. The image processing device 10 can exchange data with other devices via a communication network. Note that a program and data may be supplied to the storage unit 12 via a communication network.

The operation unit 15 is used for operation by a user. For example, a keyboard, a mouse, a touch pad, a touch panel, or a stick (lever) or the like corresponds to the operation unit 15. The display unit 16 is, for example, a liquid crystal display, an organic EL display, or the like. The sound output unit 17 is, for example, a speaker, a headphone terminal, or the like.

The image processing device 10 can access a database 20. The database 20 may be implemented in a device (for example, a server) other than the image processing device 10 or in the image processing device 10.

An image is stored in the database 20. For example, an image for use in a virtual shopping mall site provided by a Web server (not shown) is stored in the database 20. That is, an image prepared by a person in charge from a shop open in the virtual shopping mall is stored in the database 20.

Figure 2:
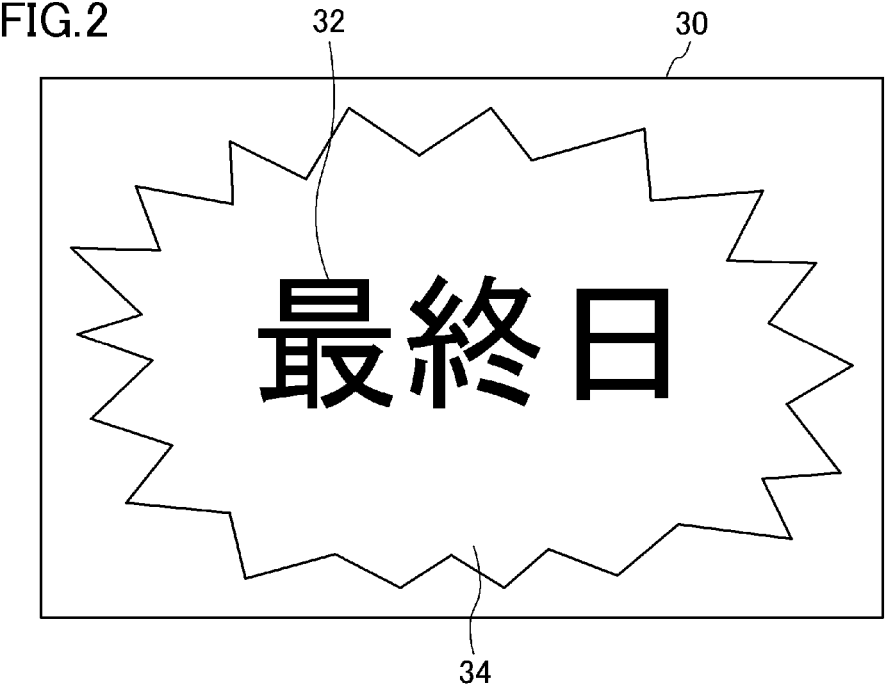
FIG. 2 shows one example of an image.

FIG. 2 shows one example of an image stored in the database 20. The image 30 shown in FIG. 2 is an image showing a character string 32 rendered on and integrated with a background image 34.

The character string 32 expresses 最終日 for use in a bargain sale, for example. Meanwhile, the background image 34 includes a figure, for example, for calling for attention, and includes two or more colors. The background image 34 may include an element, such as an image based on a real picture, that is more complicated than a geometrical figure. In this image 30, generally, the character string 32 is often rendered in an outstanding color different from that of the background image 34. Further, the character string 32 is often rendered in a single color, and aligned horizontally, vertically, or diagonally.

In the following, a technique for reading the character string 32 from the image 30 such as is shown in FIG. 2, then translating into a different language, and generating a new image including a character string after translation and the background image 34 will be described.

Figure 3:
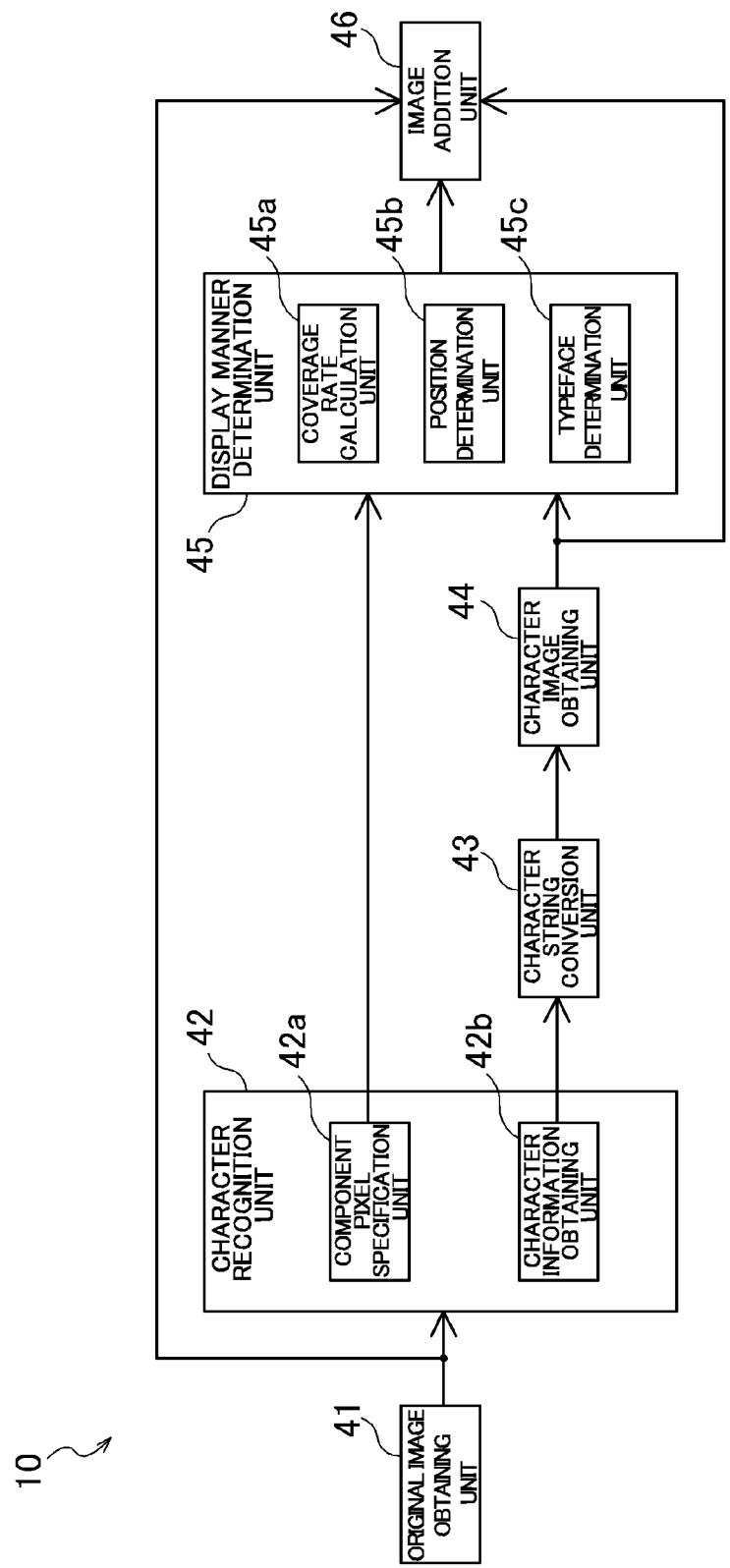
FIG. 3 is a functional block diagram showing one example of a function achieved in an image processing device.

FIG. 3 is a functional block diagram showing functions relevant to the present invention among those implemented in the image processing device 10. As shown in FIG. 3, the image processing device 10 includes an original image obtaining unit 41, a character recognition unit 42, a character string conversion unit 43, a character image obtaining unit 44, a display manner determination unit 45, and an image addition unit 46. The character recognition unit 42 includes a component pixel specification unit 42a and a character information obtaining unit 42b. The display manner determination unit 45 includes a coverage rate calculation unit 45a, a position determination unit 45b, and a typeface determination unit 45c. The function blocks shown in FIG. 3 are implemented by the control unit 11 of the image processing device 10.

The original image obtaining unit 41 obtains an image 30 from the database 20, and outputs to the character recognition unit 42 and the image addition unit 46.

Figure 5:
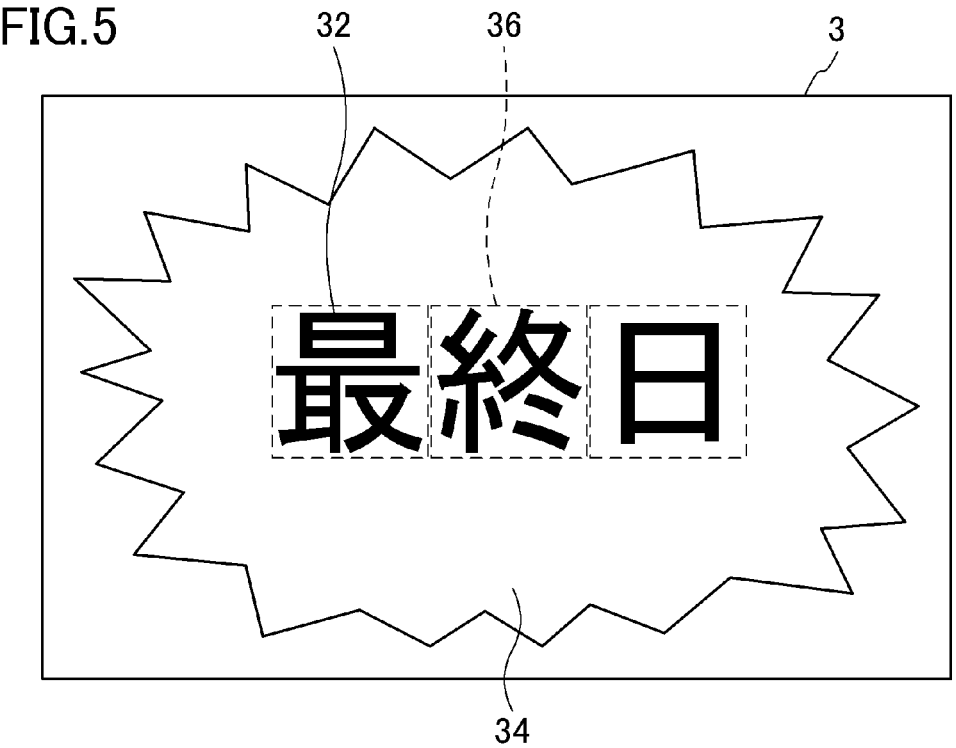
FIG. 5 shows one example of a character area specified in character recognition processing.

The character recognition unit 42 recognizes the character string 32 included in the image 30. The character string 32 before conversion included in the image 30 is one example of a first text. As character recognition processing executed by the character recognition unit 42, publicly known character recognition processing referred to as an OCR (Optical Character Recognition), for example, is employed. Specifically, the character recognition unit 42 specifies a character area 36 corresponding to each character of the character string 32, as shown in FIG. 5, and compares the pattern in the character area 36 with a pre-registered pattern to thereby recognize each character of the character string 32.

The component pixel specification unit 42a included in the character recognition unit 42 specifies a component pixel that constitutes the character string 32 included in the image 30, and outputs a component pixel map showing the positions of the component pixels to the display manner determination unit 45. Component pixels that constitute the character string 32 are specified by binarizing the character area 36 shown in FIG. 5, for example. A pattern of the component pixels is used in character recognition processing.

The character information obtaining unit 42b included in the character recognition unit 42 obtains character information indicating the character string 32 through character recognition processing, and outputs to the character string conversion unit 43. The character information includes, for example, a character code of each character included in the character string 32.

Note that although character information indicating the character string 32 is obtained through character recognition processing in this embodiment, this is not limiting. For example, character information indicating the character string 32 may be readably embedded in the image 30 and then obtained.

Having received the character information indicating the character string 32, the character string conversion unit 43 converts the character string 32 into a different character string, and outputs character information indicating a character string after conversion to the character image obtaining unit 44. A character string after conversion converted by the character string conversion unit 43 is one example of a second text. In this embodiment, the character string 32 is translated into a different language. For example, the Japanese character string 32, namely, 最終日, is translated into an English character string, namely, FINAL DAY.

The above described is not limiting, and the character string 32 may be converted into a different type of character in the same language. For example, the character string 32 最終日 may be converted into a character string in hiragana, namely, さいしゅうび, or that in katakana, namely, サイシュウビ. The number of characters included in a character string is not limited to two or more, but may be one.

In the case where the character string 32 expresses such content as a date, a price, or the like, the character string 32 may be updated to a character string expressing the latest state of the content. For example, when the control unit 11 realizes that the character string 32 expresses a date or a price, the control unit 11 obtains information on the current date or price, and updates the character string 32 to a character string expressing the current date or price.

Having received the character information indicating the character string after conversion, the character image obtaining unit 44 obtains a character image expressing the character string after conversion from a font database (not shown), and outputs to the display manner determination unit 45 and the image addition unit 46. In the case of an outline font, the character image expressing the character string after conversion is rasterized before being outputted. In the case of a bit map front, the character image expressing the character string after conversion is outputted intact.

The display manner determination unit 45 is one example of a determination means and an output means, and determines a manner of displaying the character image indicating the character string after conversion from among a plurality of predetermined display manners, based on a coverage extent by which the component pixels constituting the character string 32 included in the image 30 are covered. In this embodiment, a display manner of a character image relates to, for example, a position, a typeface, or the like, of a character image. Note here that the plurality of display manners are display manners that are different from each other in the number or percentage of non-transparent pixels. Further, the display manner determination unit 45 outputs positon specifying data that specifies a superimpose position at which the character image expressing the character string after conversion is superimposed onto the image 30, so as to be correlated to the character image to the image addition unit 46.

The coverage rate calculation unit 45a included in the display manner determination unit 45 is one example of a calculation means, and calculates a coverage rate at which non-transparent pixels of the character image expressing the character string after conversion cover the component pixels constituting the character string 32 included in the image 30.

The position determination unit 45b included in the display manner determination unit 45 determines a position for the character image expressing the character string after conversion, based on the coverage rate calculated by the coverage rate calculation unit 45a.

The typeface determination unit 45c included in the display manner determination unit 45 determines a typeface for the character image expressing the character string after conversion, based on the coverage rate calculated by the coverage rate calculation unit 45a.

Note that details of the functions of the display manner determination unit 45, the coverage rate calculation unit 45a, the position determination unit 45b, and the typeface determination unit 45c will be described later (see the flowchart in FIG. 4 to be described later).

The image addition unit 46 is one example of an addition means, and adds the character image expressing the character string after conversion onto the character string 32 in the image 30 in the display manner determined by the display manner determination unit 45. Specifically, the character image expressing the character string after conversion is added onto the image 30 at the position determined by the position determination unit 45b so as to be rendered in the typeface determined by the display manner determination unit 45c.

Note that the function blocks shown in FIG. 3 may be dispersed among a plurality of devices. For example, when the processing by the character recognition unit 42, the character string conversion unit 43, and the character image obtaining unit 44 is defined as pre-processing, the processing by the display manner determination unit 45 as main processing, and the processing by the image addition unit 46 as post-processing, these processings may be executed in separate devices. Further, these processings may be executed at discrete points of time. In this case, data generated in the pre-processing or the main processing may be temporarily stored in the database. Further, in a client server system, a client may execute a part of the processing according to an instruction from a server.

Figure 4:
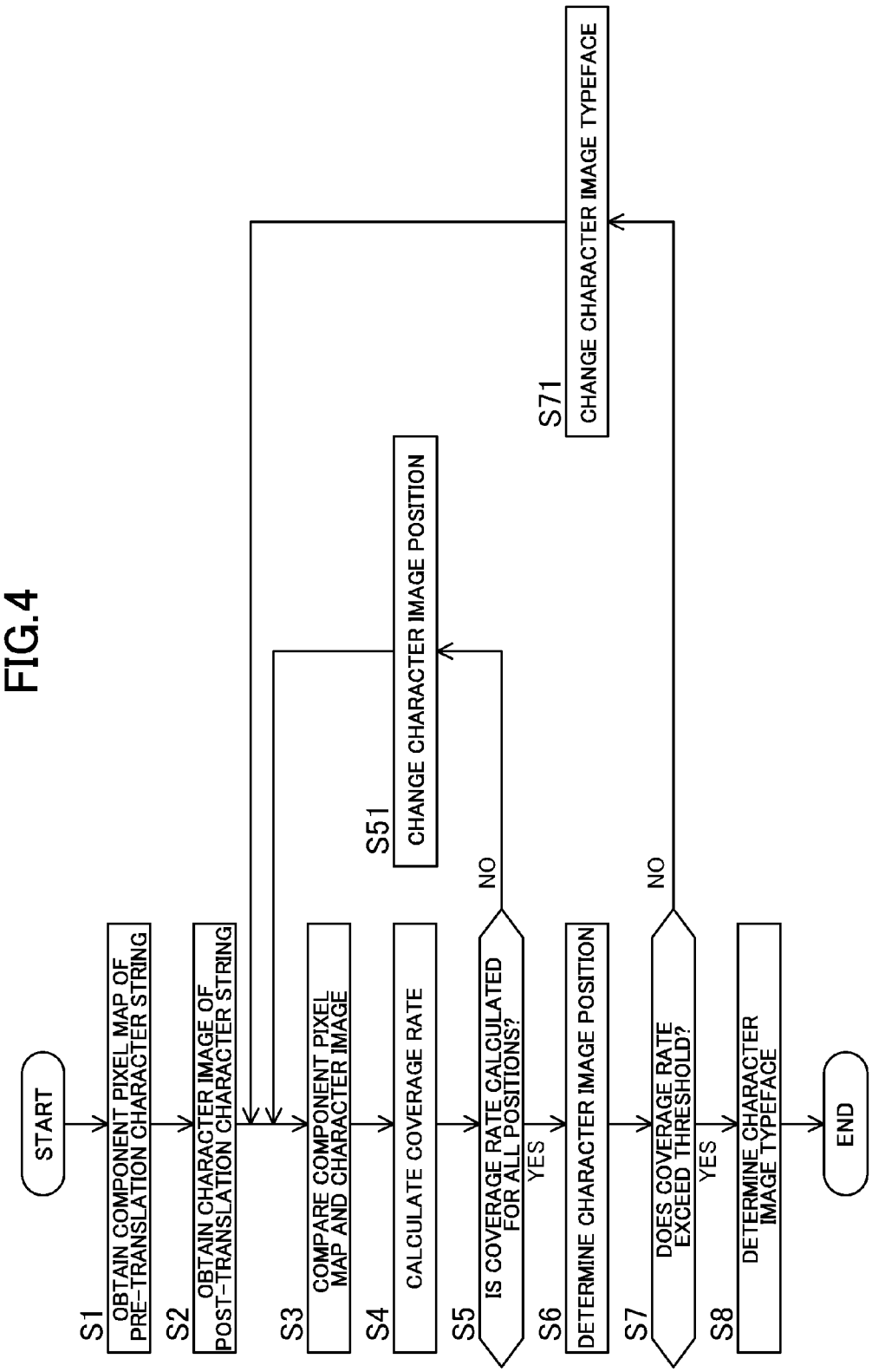
FIG. 4 is a flowchart showing one example of processing executed in an image processing device.

FIG. 4 is a flowchart showing one example of processing that is executed in the image processing device 10 in order to implement the display manner determination unit 45, the coverage rate calculation unit 45a, the position determination unit 45b, and the typeface determination unit 45c. That is, the control unit 11 executes the processing shown in FIG. 4 to thereby function as the display manner determination unit 45, the coverage rate calculation unit 45a, the position determination unit 45b, and the typeface determination unit 45c. In the following, referring to FIG. 4, details on the display manner determination unit 45, the coverage rate calculation unit 45a, the position determination unit 45b, and the typeface determination unit 45c will be described.

Figure 6:
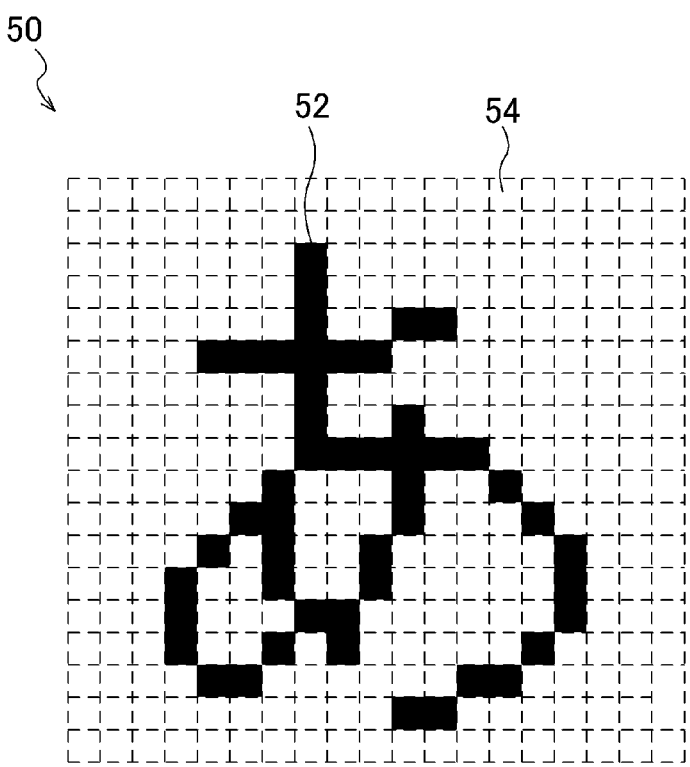
FIG. 6 shows one example of component pixel data of a pre-translation character string.

At S1, the control unit 11 obtains a component pixel map 50 of a pre-translation character string. FIG. 6 shows one example of the component pixel map 50 of a pre-translation character string. In this diagram, for facilitating comparison, a component pixel map 50 of the character あ is shown. The component pixel map 50 includes component pixels 52 that constitute each character of the pre-translation character string and non-component pixels 54 that are pixels for the background and do not constitute a character.

Figure 7:
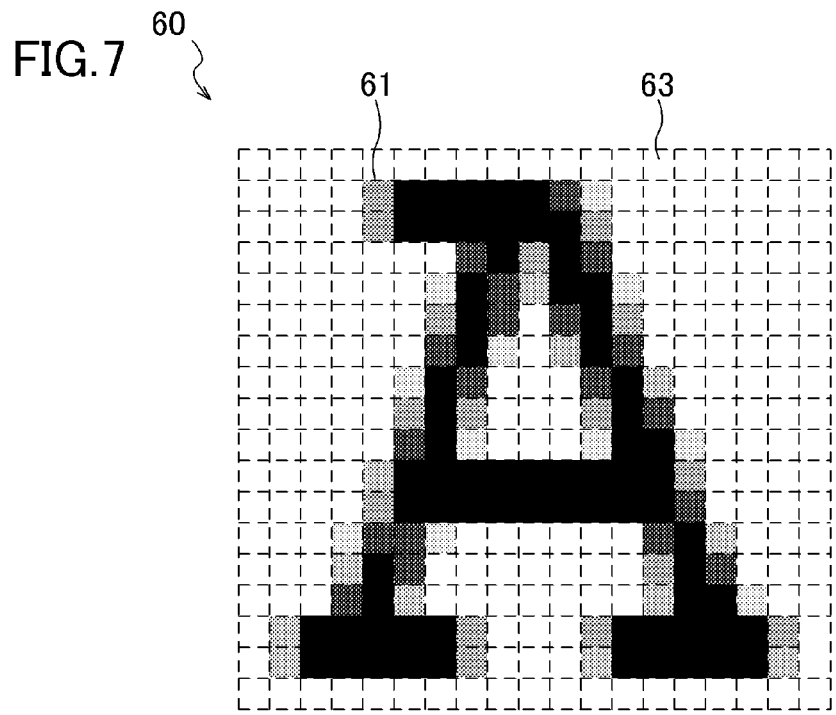
FIG. 7 shows one example of character image data of a post-translation character string.

At S2, the control unit 11 obtains a character image 60 of a post-translation character string. FIG. 7 shows one example of the character image 60 of a post-translation character string. In this diagram, for facilitating comparison, a character image 60 relevant to the character A is shown. The character image 60 includes non-transparent pixels 61 that constitute each character of the post-translation character string and transparent pixels 63 that do not constitute a character.

Note that the initial size of the character image 60 of the post-translation character string is determined in accordance with the size of the character area 36 specified in the image 30 (see FIG. 5) or the size of an area resulting from connection of a plurality of serial character areas 36. Further, as the initial typeface of the character image 60 of the post-translation character string, a predetermined standard typeface is used.

The character image 60 of the post-translation character string is one example of a cover image. A cover image may be an image obtained by adding the character image 60 to a transparent image having the same size as that of the original image 30.

Figure 8:
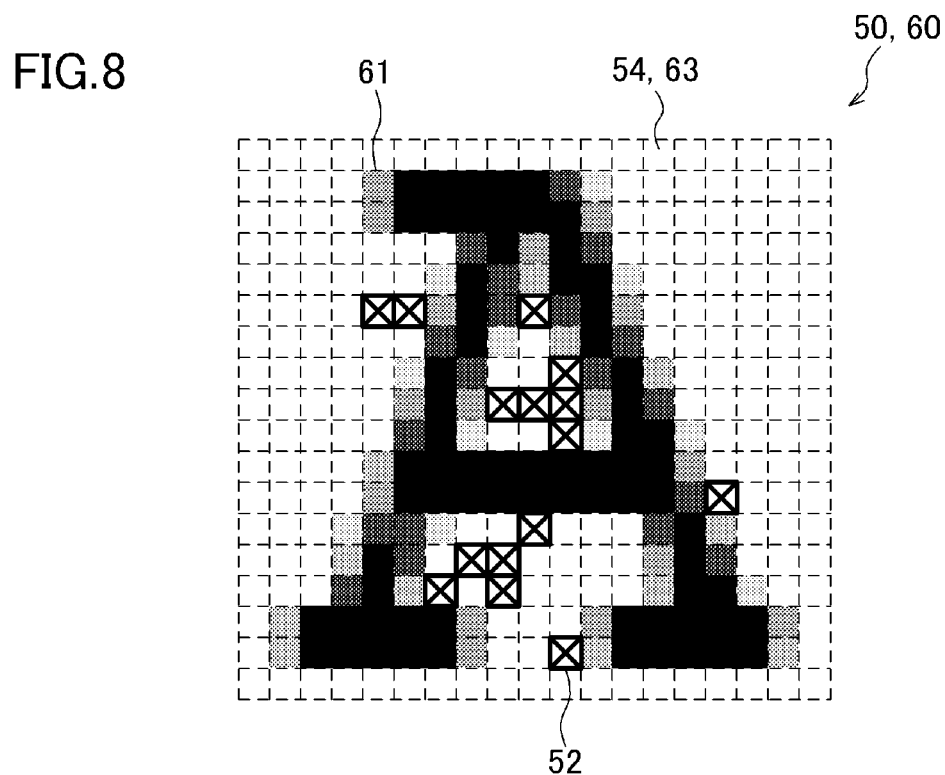
FIG. 8 shows one example of comparison between component pixel data and character image data.

At S3, the control unit 11 compares the component pixel map 50 and the character image 60. FIG. 8 shows one example of comparison between the component pixel map 50 and the character image 60. A pixel with the mark X in the diagram indicates a component pixel 52 not covered by a non-transparent pixel 61 of the character image 60 among the component pixels 52 in the component pixel map 50.

At S4, the control unit 11 calculates a coverage rate at which the non-transparent pixels 61 of the character image 60 cover the component pixels 52 in the component pixel map 50 (the function as the coverage rate calculation unit 45a). Specifically, the percentage in the number of the component pixels 52 covered by the non-transparent pixels 61 of the character image 60 relative to all component pixels 52 in the component pixel map 50 is calculated as the coverage rate.

The processing at S3 and S4 is repeated for every candidate position at which the character image 60 is added (S5 and S51). With the above, a coverage rate for every candidate position is calculated. Specifically, the control unit 11 moves the character image 60 by an amount corresponding to one pixel at each time within the range overlapping the component pixel map 50, and compares the component pixel map 50 and the character image 60 at every move to calculate the coverage rate.

At S6, the control unit 11 determines an addition position at which the character image 60 is added, based on the coverage rate for every candidate position (the function as the position determination unit 45b). Specifically, a candidate position with the highest coverage rate is determined as the addition position. The addition position is one example of the superimpose position.

At S7, the control unit 11 determines whether or not the coverage rate of the character image 60 at the addition position (that is, the highest coverage rate among those for every candidate position) is in excess of a predetermined threshold. In the case where the coverage rate is not in excess of the threshold (S7: NO), the control unit 11 changes the typeface of the character image (S71), and then repeats the processing at S3 to S7.

At S71, the typeface of the character image 60 is changed to one resulting in a larger number or percentage of the non-transparent pixels 61. Specifically, a plurality of typefaces mutually different in the number or percentage of the non-transparent pixels 61 are prepared, and a typeface of the character image 60 is changed sequentially, beginning with one resulting in a smaller number or percentage of the non-transparent pixels 61, until the coverage rate exceeds the threshold.

Figure 9:
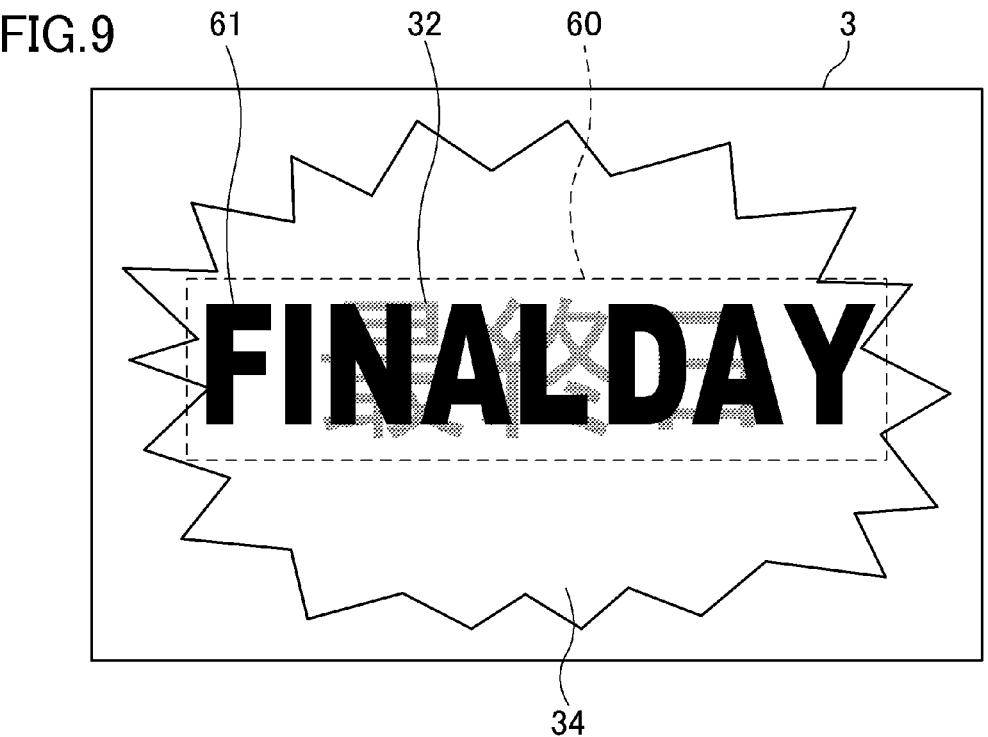
FIG. 9 shows an example of combination of a standard typeface and a character image.
Figure 10:
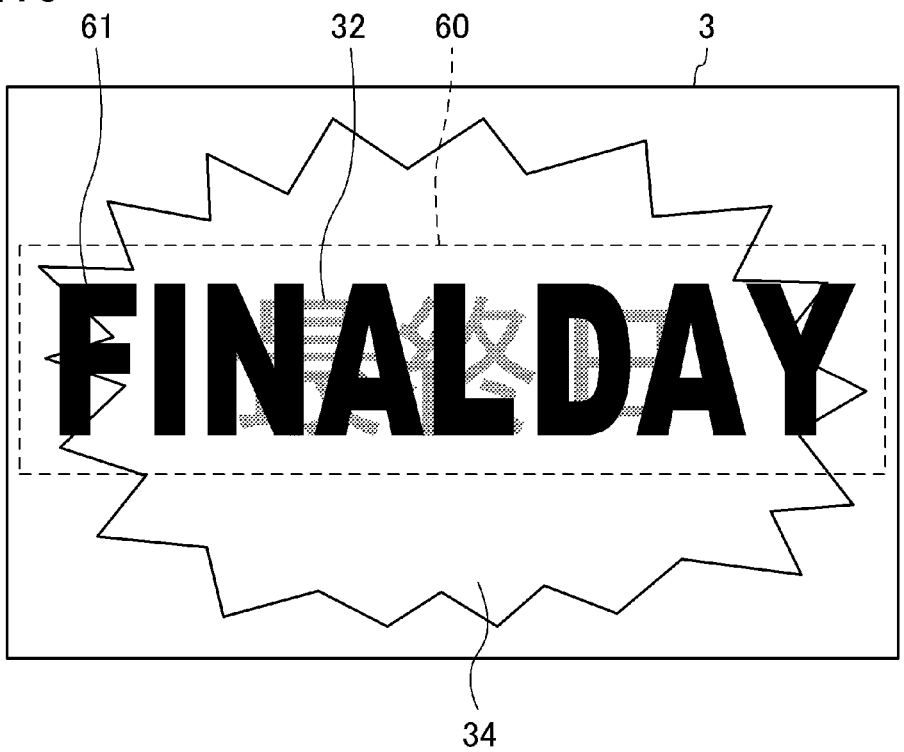
FIG. 10 shows an example of combination of an enlarged typeface and a character image.
Figure 11:
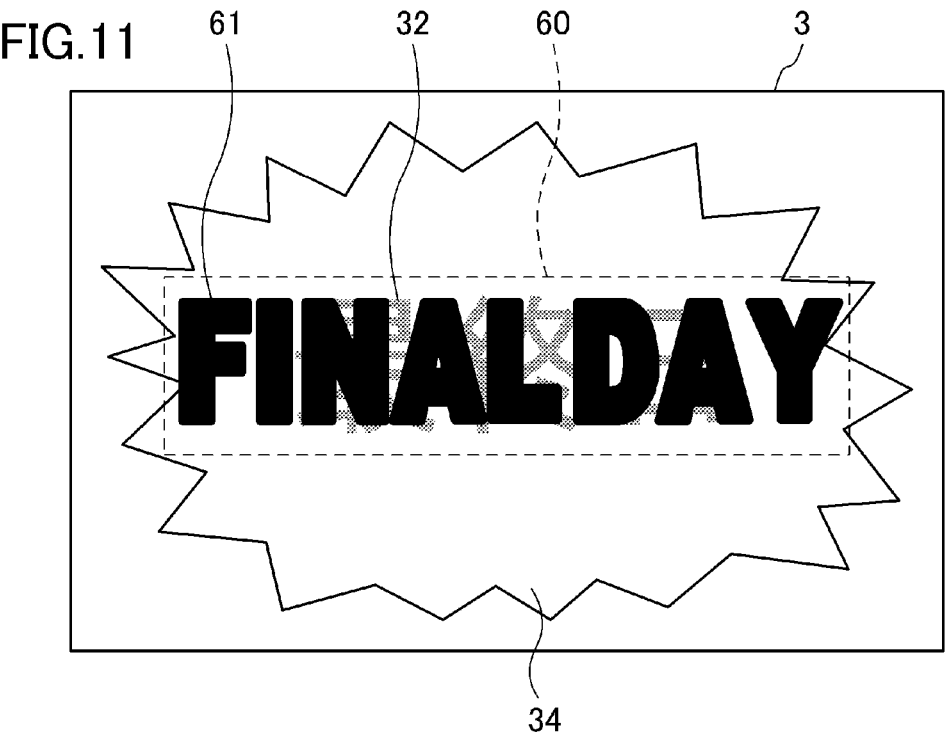
FIG. 11 shows an example of combination of a bold typeface and a character image.
Figure 12:
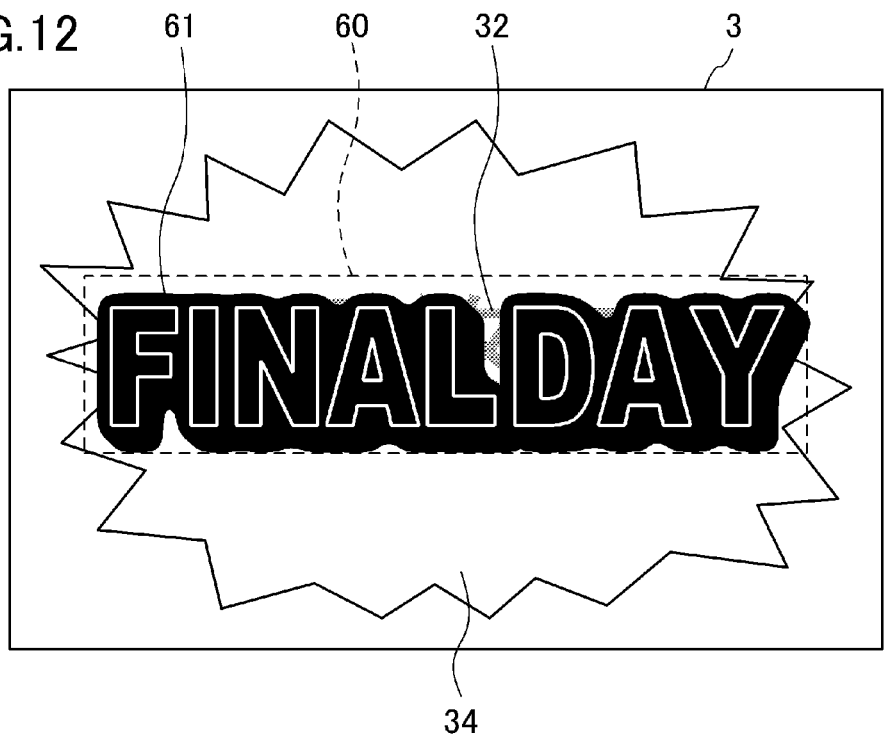
FIG. 12 shows an example of combination of a calligraphic typeface and a character image.

In this embodiment, for example, the standard typeface shown in FIG. 9, the enlarged typeface shown in FIG. 10, the bold typeface shown in FIG. 11, and the calligraphic typeface shown in FIG. 12 are applied in this order.

For explanation, FIGS. 9 to 12 show examples in which the character images 60 in the respective typefaces are actually added onto the character string 32 in the image 30. In these diagrams, the character string 32 in the image 30 is shown in a reduced brightness. As shown in these diagrams, the character image 60 expressing the character string FINAL DAY is added onto the character string 32 最終日 of the image 30. Apart of the character string 32 in the image 30, covered by the non-transparent pixels 61 of the character image 60 cannot be seen in the image after addition, while a part not covered by the non-transparent pixels 61 of the character image 60 (that is, a part overlapping the transparent pixel 63 of the character image 60) can be seen in the image after addition. As shown in these diagrams, a typeface with a later order for application results in a smaller part of the character string 32 in the image 30 that is seen.

The standard typeface shown in FIG. 9 is a typeface firstly applied in this embodiment. In the standard typeface, the size of each character of the character image 60 is substantially the same as that of each character of the character string 32 included in the image 30.

The enlarged typeface shown in FIG. 10 is a typeface secondly applied in this embodiment. In the enlarged typeface, the typeface design of each character of the character image 60 is the same as that in the standard typeface but the size of each character is larger than that in the standard typeface. Accordingly, in the enlarged typeface, the number of non-transparent pixels 61 are larger than that in the standard typeface. In the enlarged typeface, although the percentage of the non-transparent pixels 61 is the same as that in the standard typeface, the percentage of the non-transparent pixels 61 is larger than that in the standard typeface when compared in view of the character area 36 of the image (see FIG. 5).

The bold typeface shown in FIG. 11 is a typeface thirdly applied in this embodiment. In the bold typeface, although the size of each character of the character image 60 is substantially the same as that in the standard typeface, the line width of each character of the character image 60 is thicker than that in the standard typeface. Accordingly, the number and percentage of the non-transparent pixels 61 are larger than those in the standard typeface. In addition, in this embodiment, the number and percentage of the non-transparent pixels 61 in the bold typeface are larger than those in the enlarged typeface. In application of the bold typeface, the line width of each character may be made thicker while the typeface design of each character of the character image 60 may remain the same or may be changed to a typeface design with a thicker line width.

The calligraphic typeface shown in FIG. 12 is a typeface fourthly applied in this embodiment. In the calligraphic typeface, although the size and line width of each character of the character image 60 are substantially the same as those in the standard typeface, decoration is applied to the outside of the outer edge of each character of the character image 60. Accordingly, the number and percentage of the non-transparent pixels 61 are larger than those in the standard typeface. In this embodiment, the number and percentage of the non-transparent pixels 61 in the calligraphic typeface are larger than those in the enlarged typeface and the bold typeface. As the decoration applied to the outside of the outer edge of each character, for example, a shadow extending from the outer edge of each character in a particular direction, a ray spreading from the entire outer edge of each character, or the like, is available. Further, for clear boundary between a character and decoration, the outer edge of each character may be colored different from the inside of the character or the decoration. Such decoration that imparts design effect to a character is referred to also as font effect.

Note that although the typeface of the character image 60 added onto the character string 32 in the image 30 is described in FIGS. 9 to 12, variation on the typeface is not limited to these examples. For example, a typeface resulting from combination of two or three of the enlarged typeface, the bold typeface, and the calligraphic typeface may be applied. Various typefaces that are different from each other in the position, number, or percentage of the non-transparent pixels 61 can be applied.

A plurality of typefaces for the character image 60 are applied in an order beginning with one resulting in a smaller number or percentage of the non-transparent pixels 61 in this embodiment. This is because, generally, a typeface resulting in a smaller number or percentage of non-transparent pixels is high in readability of the character image itself. Moreover, application of a plurality of typefaces for the character image 60, beginning with one resulting in a smaller number or percentage of the non-transparent pixels 61, results in smaller change in visible impression from that of the character string 32 in the original image 30.

Returning to the explanation of FIG. 4, when the coverage rate is in excess of the threshold (S7: YES), the control unit 11 determines at step S8 the typeface at that time as a typeface to be applied to the character image 60 (the function as the typeface determination unit 45c). That is, the control unit 11 determines the $n^{th}$ typeface (n being a natural number) with a coverage rate that initially exceeds the threshold as a typeface to be applied to the character image 60.

With the above, a display manner (a position and a typeface in this embodiment) of the character image 60 expressing the post-translation character string to be added onto the character string 32 in the image 30 is determined based on the coverage rate.

Although an embodiment of the present invention has been described in the above, the present invention is not limited to the above described embodiment, and various modified embodiments are possible for a person skilled in the art.

That is, although a display manner of the character image 60 expressing the post-translation character string is determined based on the coverage rate calculated by the coverage rate calculation unit 45a in the above-described embodiment, this is not limiting, and the coverage rate calculation unit 45a may be omitted. For example, a typeface of the character image 60 expressing the post-translation character string may be determined, based on the number or percentage of the component pixels 52 included in the component pixel map 50. Specifically, as a larger number or percentage of the component pixels 52 results in higher probability that the component pixels 52 after addition are seen, stepwise switching of the typeface among the first to fourth typefaces for the character image 60 (FIGS. 9 to 12), depending on the number or percentage of the component pixels 52, can reduce probability that the component pixels 52 after addition are seen.

Further, although the character image 60 is added onto the original image 30 in the image processing device 10 in the above described embodiment, this is not limiting, and the character image 60 may be displayed so as to be superimposed onto the original image 30 on the screen of a display device. For example, in a client server system, a server may send position specifying data that specifies a superimpose position at which the character image 60 is superimposed on the original image 30, together with the character image 60, to a client equipped with a display device (one example of the function as an output means). Having received the character image 60 and the position specifying data, the client superimposes the character image 60 onto the original image 30 on the screen of the display device, and displays. This superimpose display can be implemented using, for example, asynchronous transmission using Ajax (Asynchronous JavaScript+XML (JavaScript is a registered trademark)).

Note that a structure in which a server sends the character image 60 to a client is not limiting, and a cover image resulting from addition of the character image 60 onto a transparent image having the same size as that of the original image 30 may be sent. That is, the server adds the character image 60 at a superimpose position on a transparent image having the same size as that of the original image 30, and sends the resulting cover image to a client. Then, the client superimposes the cover image onto the original image 30 on the screen of the display device, and displays. In this case, as the display position and the size of the cover image are the same as those of the original image 30, the position specifying data specifying a display position of a cover image can be readily generated.

The invention claimed is:

1. An image processing device, comprising:
a processor; and
at least one memory device that stores a plurality of instructions, which when executed by the processor, cause the processor to:
change a display manner of a second text in a cover image to be superimposed onto an original image integrated with a first text, until a coverage rate by which the first text in the original image is covered by the second text in the cover image exceeds a predetermined threshold, the display manner includes a display typeface which is a factor for changing the coverage rate; and
output position data specifying a superimpose position at which the cover image integrated with the second text to be displayed in the display manner determined is superimposed onto the original image, so as to be correlated to the cover image,
wherein the to change the display manner comprises to select any candidate typeface from among candidate typefaces that are candidates for the display typeface until the coverage rate by which the second text displayed in the candidate typeface selected exceeds the predetermined threshold.

2. The image processing device according to claim 1, wherein the processor further selects a candidate typeface from among the candidate typefaces, beginning with a candidate typeface that results in a smaller amount of a non-transparent part of the second text.

3. The image processing device according to claim 1, wherein the candidate typefaces include, besides a standard display typeface, at least any of an enlarged display typeface of which character size is larger than that of the standard display typeface, a bold display typeface of which line width of a character is thicker than that of the standard display typeface, and a calligraphic display typeface in which decoration is applied to an outside of an outer edge of a character.

4. The image processing device according to claim 1, wherein the processor further:
calculates the coverage rate, and
changes the display manner of the second text until the calculated coverage rate exceeds the predetermined threshold.

5. The image processing device according to claim 4, wherein the processor further:
sequentially calculates the coverage rate for every candidate position indicating a candidate for a relative position of the second text relative to the first text, and
determines whether or not the coverage rate sequentially calculated for every candidate position exceeds the predetermined threshold.

6. The image processing device according to claim 1, wherein the processor further outputs the cover image and the position data in order to add the cover image at the position specified by the position data on the original image.

7. The image processing device according to claim 1, wherein the processor further outputs the cover image and the position data to a display device equipped with an image display function in order to superimpose the cover image onto the position specified by the position data on the original image.

8. An image processing method, comprising:
changing a display manner of a second text in a cover image to be superimposed onto an original image integrated with a first text, until a coverage rate by which the first text in the original image is covered by the second text in the cover image exceeds a predetermined threshold, the display manner includes a display typeface which is a factor for changing the coverage rate; and
outputting position data specifying a superimpose position at which the cover image integrated with the second text to be displayed in the display manner determined is superimposed onto the original image, so as to be correlated to the cover image,
wherein the changing the display manner comprises selecting any candidate typeface from among candidate typefaces that are candidates for the display typeface until the coverage rate by which the second text displayed in the candidate typeface selected exceeds the predetermined threshold.

9. A non-transitory computer readable information storage medium storing a program for causing a computer to:
change a display manner of a second text in a cover image to be superimposed onto an original image integrated with a first text, until a coverage rate by which the first text in the original image is covered by the second text in the cover image exceeds a predetermined threshold, the display manner includes a display typeface which is a factor for changing the coverage rate; and
output position data specifying a superimpose position at which the cover image integrated with the second text to be displayed in the display manner determined is superimposed onto the original image, so as to be correlated to the cover image,
wherein the to change the display manner comprises to select any candidate typeface from among candidate typefaces that are candidates for the display typeface until the coverage rate by which the second text displayed in the candidate typeface selected exceeds the predetermined threshold.

* * * * *